United States Patent [19]

Mead

[11] Patent Number: 4,675,061

[45] Date of Patent: Jun. 23, 1987

[54] METHOD FOR FORMING CORRUGATED MATERIALS USING MEMORY METAL CORES

[75] Inventor: Albert R. Mead, Setauket, N.Y.

[73] Assignee: Grumman Aerospace Corporation, Bethpage, N.Y.

[21] Appl. No.: 779,765

[22] Filed: Sep. 24, 1985

[51] Int. Cl.⁴ .................. B32B 31/04; B32B 31/26; B29C 33/44

[52] U.S. Cl. .................................. 156/155; 156/245; 264/219; 264/258; 264/313; 264/334

[58] Field of Search ............... 264/258, 137, 313, 308, 264/334, 219, 324, 320, 337, 230, 134, 136, 39; 249/178, 152, 175; 156/85, 155, 245

[56] References Cited

U.S. PATENT DOCUMENTS

| | | | |
|---|---|---|---|
| 1,281,258 | 10/1918 | Alexander | 249/178 |
| 1,349,372 | 8/1920 | Egan | 264/255 |
| 1,393,541 | 10/1921 | Kemp | 264/258 |
| 2,454,719 | 11/1943 | Scogland | 156/155 |
| 3,379,591 | 4/1968 | Bradley | 156/173 |
| 3,805,567 | 2/1984 | Agius-Sinerco. | |
| 3,872,573 | 3/1975 | Nichols et al. . | |
| 3,900,939 | 8/1975 | Greacen . | |
| 3,913,444 | 10/1975 | Otte . | |
| 4,001,928 | 1/1977 | Schweiso . | |
| 4,035,007 | 7/1977 | Harrison et al. . | |
| 4,198,081 | 4/1980 | Harrison et al. . | |
| 4,237,609 | 12/1980 | Clabburn et al. | 29/859 |
| 4,338,970 | 7/1982 | Krackeler et al. | 138/141 |
| 4,433,567 | 4/1974 | Mead . | |

Primary Examiner—Jan H. Silbaugh
Assistant Examiner—Karen D. Kutach
Attorney, Agent, or Firm—Pollock, VandeSande & Priddy

[57] ABSTRACT

A base layer of fabric sheets impregnated with bonding material is deposited on a mold form. A plurality of parallel spaced hollow cores, fabricated from memory metal alloy, are positioned on the base layer. An overlying layer is then positioned over the cores and the base layer, the overlying layer also being impregnated with bonding material. The assembly is subjected to heat and pressure to cure all the layers. The core is then subjected to a critical temperature causing the core to shrink and permitting its easy removal. The result is a base layer to which the overlying layer is bonded, the overlying layer characterized by corrugations which stiffen the entire structure and increase its structural strength.

1 Claim, 5 Drawing Figures

4,675,061

METHOD FOR FORMING CORRUGATED MATERIALS USING MEMORY METAL CORES

FIELD OF THE INVENTION

The present invention is related to molding apparatus and more particularly to a method and apparatus for forming corrugated or stiffened sheet materials by utilizing memory cores which are easily removable after molding.

BACKGROUND OF THE INVENTION

In order to increase the strength and rigidity of sheet materials, corrugations are often formed in the material. This is often the case with aircraft skin panels wherein the interior surface of the panels has integrally formed corrugations for achieving requisite stiffness and strength.

In recent years, increasing use has been made of composite resin-impregnated fabrics, including graphite, Kevlar and glass fibers to achieve requisite panel strength at reduced weights and radar. In order to form such composite panels, a number of resin-impregnated sheets, constituting a base layer, are positioned over a mold form. Cores are then positioned on top of the base layer, and subsequently, an overlying layer of composite sheets is positioned over the core. The entire assembly is loaded into an autoclave where heat and pressure are applied to cause curing of the resin in the composite material and achieve superior bonding between the various sheets of the overlying layer and base layer. A principal disadvantage of the prior art lies in the use of cores which stick to the composite sheets after curing. As a result, their attempted removal may weaken or destroy the formed layers.

The present invention avoids this problem by utilizing cores fabricated from memory alloys.

BRIEF DESCRIPTION OF THE INVENTION

The present invention utilizes cores fabricated from memory metal alloys. The cores are easily removed after a molding process by subjecting each core to the critical temperature of the alloys wherein the core contracts in all directions, thereby permitting its simple removal from the molded structure. In summary, after the core is between base and overlying layers of resin-impregnated composite material, core expansion pressure has been applied to the interior of the core thereby initially expanding the dimensions of the core. After curing, the core is subjected to the critical temperature of the memory metals for contracting the core in preparation of its withdrawal. Due to the fact that the core is easily removed, the integrity of the composite materials may be maintained and the core reused for subsequent molding cycles.

BRIEF DESCRIPTION OF THE FIGURES

The above-mentioned objects and advantages of the present invention will be more clearly understood when considered in conjunction with the accompanying drawings in which.

DETAILED DESCRIPTION OF THE INVENTION

Figure 1:
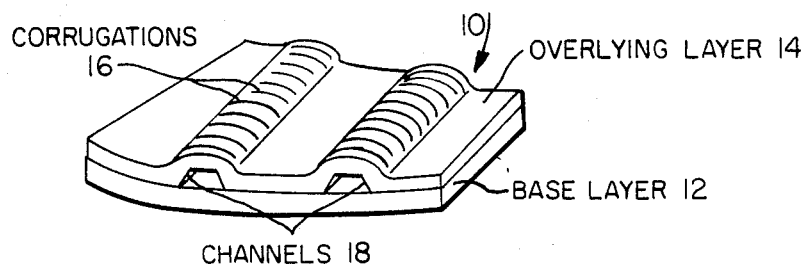
FIG. 1 is a perspective view of a prior art aircraft skin panel.
Figure 2:
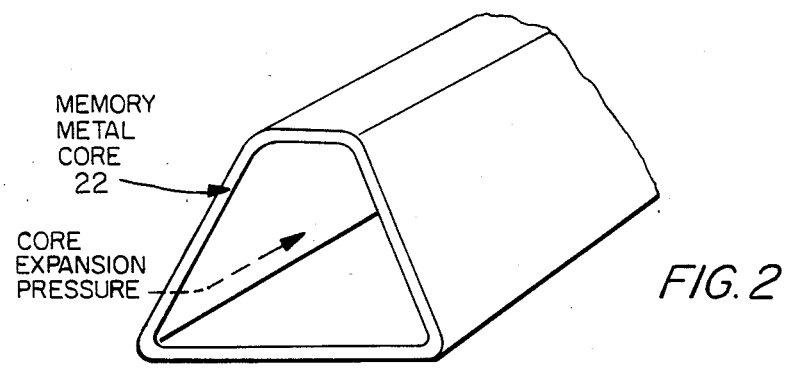
FIG. 2 is a perspective view of a memory alloy core employed in the present invention.
Figure 3:
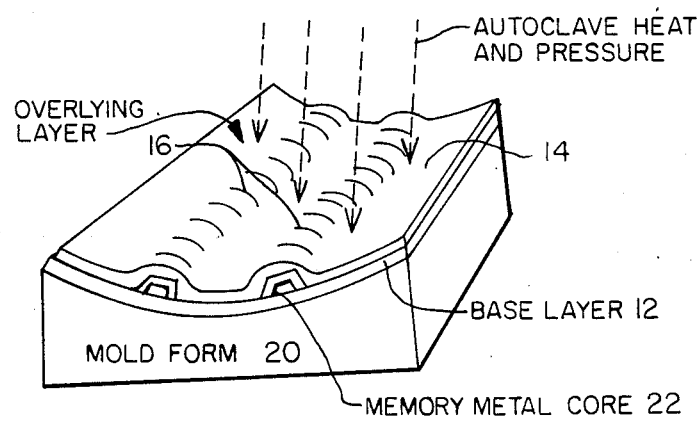
FIG. 3 is a perspective view of an aircraft skin panel in accordance with the present invention.

FIG. 1 illustrates a prior art finished skin panel assembly generally indicated by reference numeral 10, including a base layer 12 bonded to an overlying layer 14 having corrugations 16 formed therealong due to the insertion of parallel spaced cores within channels 18, during a previous molding process. The base layer 12 may form the external skin surface of an aircraft. The corrugations 16 formed in the overlying layer 14 serve as an integrally formed stiffener for the skin. The process for fabricating the prior skin panel assembly 10 of FIG. 1 will now be explained. An initial base layer 12, as shown in FIG. 3, is deposited on a mold form 20. A number of tubular metal cores 22 having the shape shown in FIG. 2 are positioned in spaced parallel relationship on base layer 12, as indicated in FIG. 3. An overlying layer 16 is then deposited on the cores and the base layer 12. The resulting assembly of parts is then positioned in an autoclave where heat and pressure are applied, thereby causing excellent bonding of the overlying layer and base layer, due to curing of a resin component in layers 12 and 14 which is necessary for the bonding process.

Afterward, the cores 22 must be removed. In conventional fabrication techniques, this presents a difficulty because the cores have a tendency to stick to the base layer 12 and overlying layer 14. As previously mentioned, the removal step may injure these layers, resulting in a decrease of their strength and integrity.

In the case of the present invention, the core is not made from conventional core metal but, rather, from memory metal alloys. After bonding has been completed, the temperature of the autoclave is adjusted so that the critical temperature of the memory metal alloy is reached, thereby resulting in contraction of the core dimensions in all directions. Consequently, the cores may be easily removed and the bonded overlying and base layers lifted from the mold form 20, resulting in the same finished corrugated skin panel assembly 10 as was produced by the prior art process.

Figure 4:
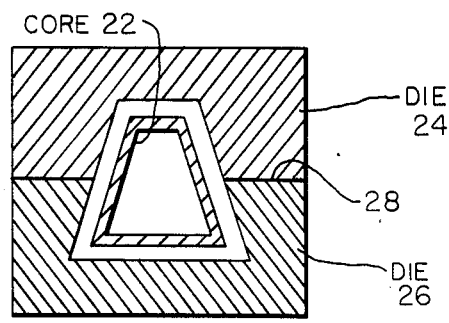
FIG. 4 is a cross-sectional view of a reusable core positioned between two dies which ensure final dimensional accuracy of the die.

It should be pointed out that, after removal of each core 22, it may be reused an indefinite number of times. However, each time the core is to be used, it must be dimensionally initialized. This can be achieved by inserting the core between dies 24 and 26 as shown in FIG. 4. As indicated in the figure, the dies contact one another at the junction 28 of the die surfaces. Core expansion pressure is then introduced within the interior of a memory metal core, as shown in FIG. 2, which expands the walls of the memory metal alloy core 22. Of course, other core expansion pressure processes may be employed. As the core expands it contacts the walls of the dies at which time expansion pressure ceases and the dimensionally initialized core may be removed and is now ready for use to be placed over the base layer 12 in preparation of a molding procedure, as previously explained in connection with FIG. 3.

In a preferred embodiment of the invention, the base layer 12 and overlying layer 14 (FIGS. 1 and 3) may each be made up from a composite material including epoxy pre-impregnated fabric sheets of graphite, Kevlar or glass fibers. Such pre-impregnated sheets of woven fibers are available from sources such as CIBA-GEIGY or Hercules Corporation. Memory metal alloys of an appropriate nature are available from Memory Metals, Inc., of Stamford, Conn., and Ray-Chem of London, England; and the critical temperatures for obtaining contraction of the alloys is generally specified by the manufacturer.

Figure 5:
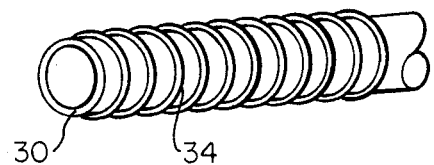
FIG. 5 is a perspective view of a memory metal alloy mandrel for use in a filament winding process.

The present invention need not be restricted to cores for forming corrugated integrally stiffened aircraft skin panels. The concept of the present invention extends to the machining or forming of memory metal cores to be used as cores in a filament winding process. For example, as indicated in FIG. 5, a mandrel 30 fabricated from a memory metal alloy serves as a core for filament 34, which is wound along the external surface of mandrel 30. The filament may be of the resin pre-impregnated type which facilitates curing. After curing, the mandrel may be subjected to a critical temperature which results in the shrinking of the mandrel, thereby permitting its easy removal, in the same manner as that prescribed in connection with a memory metal alloy core 22 (FIG. 3). This leaves a hardened tubular structure that is a filament wound, useful in many industrial applications.

Thus, from the previous description of the invention, it will be appreciated that the utilization of a memory metal alloy for a corrugation core or a filament mandrel permits its rapid and effective withdrawal after surrounding resin-impregnated materials have been cured. It should also be pointed out that the present invention is compatible with room temperature curing resin systems.

It should be understood that the invention is not limited to the exact details of construction shown and described herein for obvious modifications will occur to persons skilled in the art.

I claim:

1. A method for molding material into corrugated form, including the steps of:

preliminarily dimensionally initializing the dimensions of a memory metal alloy core by expanding the core while it is located between fixed die members;

terminating expansion of the core when it expands to walls of the die members at which time the final dimensions of the core are attained;

removing the core from the die members to permit its use for molding the material;

positioning a base layer comprised of stacked sheets of resin-impregnated fabric on a molding form;

positioning at least one dimensionally initialized core on the base layer;

positioning an overlying layer comprised of resin-impregnated fabric over the base layer and the core curing the layers;

subjecting the layers to pressure during curing for optimizing bonding between the layers;

subjecting the core to a critical temperature to cause contraction of the core; and removing the core;

whereby the overlying layer is bonded to the base layer and wherein the overlying layer includes corrugations integrally formed therein to stiffen the base layer.

* * * * *

UNITED STATES PATENT AND TRADEMARK OFFICE
CERTIFICATE OF CORRECTION

PATENT NO. : 4,675,061
DATED : June 23, 1987
INVENTOR(S) : Albert R. Mead

It is certified that error appears in the above-identified patent and that said Letters Patent is hereby corrected as shown below:

Column 1, line 65, after "memory" insert --metal--.

Column 2, line 61, after "removed" delete "and" and insert --. The core--.

Column 2, line 62, delete "for use".

Column 3, line 7, change "is" to --are--.

Signed and Sealed this

Twenty-fourth Day of November, 1987

Attest:

DONALD J. QUIGG

*Attesting Officer*        *Commissioner of Patents and Trademarks*